United States Patent [19]

Macks

[11] Patent Number: 5,760,625

[45] Date of Patent: Jun. 2, 1998

[54] LOW COST MICROCOMPUTER POWER SUPPLY WITH POWER ON RESET AND LOW VOLTAGE INHIBIT FUNCTIONALITY

[75] Inventor: Harold Ryan Macks, Detroit, Mich.

[73] Assignee: Ford Motor Company, Dearborn, Mich.

[21] Appl. No.: 538,491

[22] Filed: Oct. 3, 1995

[51] Int. Cl.$^6$ .................................................. H03K 3/02
[52] U.S. Cl. .......................... 327/198; 327/143; 327/540; 327/584
[58] Field of Search ..................................... 327/142, 143, 327/198, 538, 540, 584, 580; 323/311

[56] References Cited

U.S. PATENT DOCUMENTS

| | | | |
|---|---|---|---|
| 4,052,660 | 10/1977 | Shuey | 323/19 |
| 4,103,220 | 7/1978 | Huntley | 323/19 |
| 4,254,347 | 3/1981 | Ray | 307/297 |
| 4,367,422 | 1/1983 | Leslie | 327/143 |
| 4,428,020 | 1/1984 | Blanchard, Jr. | 361/90 |
| 4,469,957 | 9/1984 | Kruger et al. | 307/200 X |
| 4,614,880 | 9/1986 | Go et al. | 307/200 A |
| 5,313,112 | 5/1994 | Macks | 307/296.3 |
| 5,502,416 | 3/1996 | Pietrobon | 327/538 |
| 5,543,741 | 8/1996 | Purtis | 327/143 |

FOREIGN PATENT DOCUMENTS

| | | |
|---|---|---|
| A-1 233 909 | 6/1971 | United Kingdom . |
| A-2 131 238 | 6/1984 | United Kingdom . |

*Primary Examiner*—Timothy P. Callahan
*Assistant Examiner*—Jung Ho Kim
*Attorney, Agent, or Firm*—Paul K. Godwin

[57] ABSTRACT

A low cost, less complex microcomputer power supply circuit with temperature stability and low current consumption in which a single voltage regulating element is used to provide the supply voltage, power-on reset (POR) and low voltage inhibitor (LVI) functions to the microcomputer (12). In an exemplary embodiment, the power supply circuit (10) includes a regulating circuit with a zener diode (30) that is conductive when the voltage level of the DC source (14) is above a threshold value and nonconductive when the voltage level of the DC source (14) is below a threshold value. The regulator circuit provides a regulated supply voltage to the microcomputer from the DC source (14). The regulator circuit also provides a regulation signal, whose state depends on the conductivity of the zener diode (30), to a reset circuit. The reset circuit of the power supply circuit is responsive to the regulation signal for providing a reset signal to the microcomputer (12). The state of the reset signal similarly depends upon the conductivity of the zener diode (30). Accordingly, when the zener diode (30) is nonconductive, operation of the microcomputer (12) is inhibited. Alternatively, when the zener diode (30) is conductive, operation of the microcomputer (12) is enabled. In one embodiment, the power supply (10) further includes a time delay circuit (28, 32 and 34) for delaying initialization of the microcomputer to a known operating state until the DC source voltage rises above the threshold value for a period of time.

5 Claims, 1 Drawing Sheet

LOW COST MICROCOMPUTER POWER SUPPLY WITH POWER ON RESET AND LOW VOLTAGE INHIBIT FUNCTIONALITY

BACKGROUND OF THE INVENTION

1. Technical Field

The present invention relates generally to power supply circuitry for microcomputers and more particularly to power supply circuits that also provide power on reset (POR) and low voltage inhibit (LVI) functionality to the microcomputer.

2. Discussion of the Prior Art

It is well known that microcomputers operating from regulated power supplies must be inhibited during both the power-up phase and in the event that the DC power to the regulated power supply is interrupted or drops below a predetermined level. Prior circuits such as that shown in U.S. Pat. No. 5,313,112, which issued to the present inventor and is incorporated herein by reference, sought to find a low cost solution to achieving the desired functions. Alternative and more costly solutions are embodied in custom integrated circuits such as the CS-8126 low dropout, high current linear regulator manufactured by the Cherry Semiconductor Corporation.

A disadvantage of these prior approaches, however, is that separate voltage regulating elements are required. One to provide the regulated supply voltage, and at least one other for use as a comparison reference for the POR/LVI functions. These separate voltage regulating elements add cost and complexity to the microcomputer power supply circuitry. Accordingly, there is a need for a lower cost, less complex solution that combines the supply and reset functions so that only a single voltage regulating element is required to achieve the desired operation.

SUMMARY OF THE INVENTION

It is therefore an object of the present invention to provide a lower cost, less complex microcomputer power supply circuit with temperature stability and low current consumption. It is a further object to utilize a single voltage regulating element to provide the supply voltage, power-on reset (POR) and low voltage inhibitor (LVI) functions to the microcomputer.

The above objects are achieved, and disadvantages of the prior art approaches overcome, by providing a circuit that couples power from a DC source to a microcomputer and resets the microcomputer when the voltage level of the DC source rises above a threshold level. The circuit comprises a regulator circuit with a zener diode that is conductive when the voltage level of the DC source is above a threshold value and nonconductive when the voltage level of the DC source is below a threshold value. The regulator circuit provides a regulated supply voltage to the microcomputer from the DC source. The regulator circuit also provides a regulation signal, whose state depends on the conductivity of the zener diode, to a reset circuit. The reset means of the power supply circuit is responsive to the regulation signal for providing a reset signal to the microcomputer. The state of the reset signal similarly depends upon the conductivity of the zener diode. Accordingly, when the zener diode is nonconductive, operation of the microcomputer is inhibited. Alternatively, when the zener diode is conductive, operation of the microcomputer is enabled. In one embodiment, the power supply further includes delay means coupled to the regulator circuit for delaying enablement of the microcomputer operation for a predetermined period of time after the level of the DC source voltage rises above the threshold value.

An advantage of the above aspect of the invention is that a single voltage regulating element provides the supply voltage, power-on reset (POR) and low voltage inhibitor (LVI) functions to the microcomputer with increased temperature stability and low current consumption. A further advantage of the present invention is its low cost and reduced complexity.

BRIEF DESCRIPTION OF THE DRAWINGS

The above objects and advantages of the present invention will be more clearly understood by reading an example of a preferred embodiment in which the invention is used to advantage with reference to the attached drawings wherein like numerals refer to like parts and wherein.

DETAILED DESCRIPTION OF AN EMBODIMENT

Figure 1:
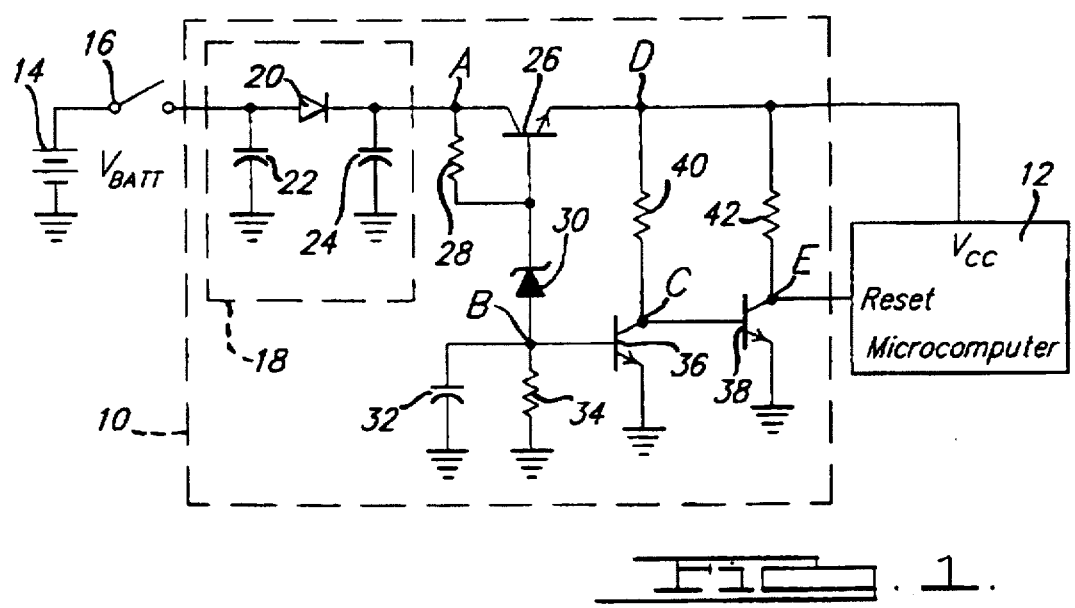
FIG. 1 is a schematic representation of a system embodying the present invention.

Referring first to FIG. 1, power supply circuit 10 is showed coupled to power input terminal $V_{CC}$ of microcomputer 12. In this embodiment, as well as most applications in an automotive vehicle electronics environment, requires the voltage applied at $V_{CC}$ be 5.0 volts. Power supply circuit 10 receives an unregulated level of voltage $V_{BATT}$ from a conventional vehicle battery 14 that is ideally charged to a voltage between 12 and 14 volts DC by conventional charging device, such as an alternator/regulator system (not shown). Typically however, the voltage supplied by battery 14 fluctuates in a range of 8 volts to 18 volts. As shown in FIG. 1, conventional ignition switch 16 may be included so that power supply circuit 10 can be selectively energized by battery 14.

In the present example, microcomputer 12 is a MC6805P9A microprocessor manufactured by Motorola Incorporated. However, power supply circuit 10 of the present invention is applicable to any number of microprocessors or microcomputers for which a reset signal is desirable to initialize the device to a known start up state or to inhibit operation when supply voltage drops below the manufacturer's recommended input voltage (typically about 4.5 volts).

Continuing with FIG. 1, power supply circuit 10 includes signal conditioning circuitry 18 which includes diode 20 and capacitors 22 and 24. Diode 20 provides reverse battery protection if the battery terminals are reversed. Capacitor 22 bypasses electromagnetic noise and radio frequency interference. And, capacitor 24 allows the regulated output voltage to continue at the supply terminal $V_{CC}$ should battery power be momentarily interrupted.

The output of signal conditioning circuitry 18 couples to the input (defined node A) of regulating circuitry that includes NPN transistor 26. Resistor 28 provides a current path so that a base voltage is established at transistor 26 to bias it as an emitter-follower. The cathode of zener diode 30 connects to the base of transistor 26. The anode of zener diode 30 (defined node B) couples to capacitor 32 and resistor 34. Together, resistors 28 and 34 along with capacitor 32 provide a time delay which will be described in greater detail later herein. The anode of zener diode 30 also couples to reset circuitry which includes transistor 36 and inverting transistor 38. The collector of transistor 6 (defined node C) couples to the output of the regulator circuitry at the emitter of transistor 26 (defined node D) through pull-up resistor 40. Similarly, the collector of transistor 38 couples to the emitter of transistor 26 through pull-up resistor 42. The collector of transistor 38 also couples to the reset terminal of microcomputer 12.

Figure 2:
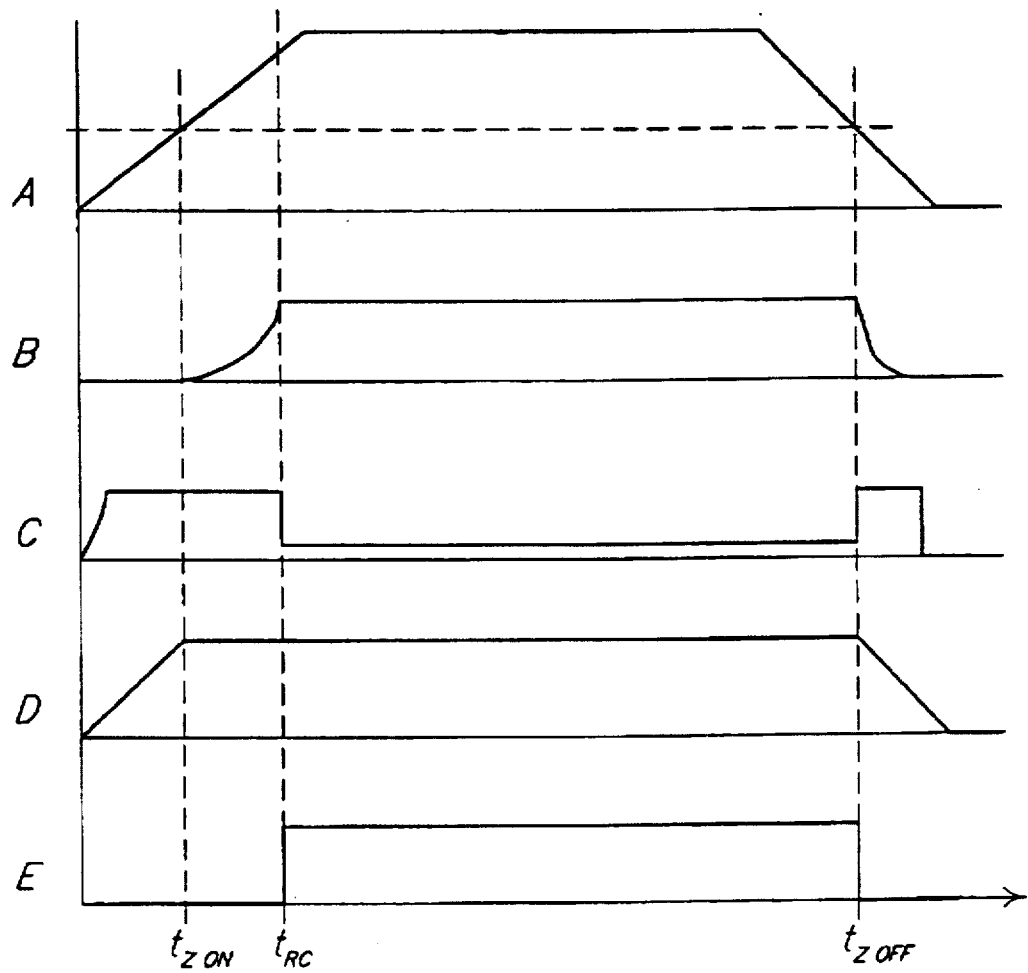
FIG. 2 graphically illustrates voltage as a function of time for defined nodes of the circuit shown in FIG. 1.

Having described the various components of power supply circuit 10 and their various interconnections, the operation of power supply circuit 10 will now be described with concurrent reference to FIGS. 1 and 2. The curves associated with the respective defined nodes shown in FIG. 2 are intended to illustrate the operation of power supply circuit 10 in providing the power on reset (POR) and low voltage inhibit (LVI) functions. For these illustrative purposes, the conditioned battery voltage at node A is shown linearly ramping up to a level above a threshold value and then linearly ramping down to a level below the threshold value after a period of time (see curve A in FIG. 2). One skilled in the art will recognize that in practice, this voltage typically changes much more rapidly and most likely contains some transient noise.

Generally, power supply circuit 10 provides a stable regulated output voltage signal (5 volts in this example) to power input terminal $V_{CC}$ when ignition switch 16 is closed and the voltage level $V_{BATT}$ of battery 14 is greater than 6.4 volts. In addition, power supply circuitry 10 provides a relatively low (ground level) reset signal to microcomputer 12 when the supply voltage present at input terminal $V_{CC}$ is below its specified voltage requirement.

When the level of the DC source (battery 14) is greater than the specified 6.4 volt threshold, a regulation current flows through resistor 28, zener diode 30, and the base-emitter junction of transistor 36. In the current embodiment, zener diode 30 is a low test current 4.7 volt zener diode. Although zener diode 30 is nominally a 4.7 volt zener diode, at battery voltages between 8.5 volts and 16.5 volts, approximately 5 volts is nominally established across the device because of the increased current flow through it. Accordingly, for the purposes of this description, zener diode 30 is treated as having a 5 volt zener voltage.

When the regulating current path is achieved, the base-emitter junction of transistor 36 is forward biased so that approximately 0.6 volts is present at the base of transistor 36. However, the base-emitter junction of transistor 36 cannot forward bias until capacitor 32 is charged to 0.6 volts. The delay time is controlled by the time constant defined by capacitor 32 and the parallel combination of resistors 28 and 34. Accordingly, until capacitor 32 is charged sufficiently, transistor 36 will remain off (see curve B in FIG. 2).

Once zener diode 30 is conducting ($t_{Z\,ON}$), zener diode 30 regulates the voltage at the base of transistor 26 to a voltage level of approximately 5.6 volts. Accordingly, the base-emitter junction of transistor 26 is forward biased so that it operates as an emitter-follower to provide a regulated output voltage of approximately 5.0 volts at its emitter to the input power terminal $V_{CC}$ of microcomputer 12 (see node D of FIG. 2).

Variations in the 5 volt regulated output delivered to power input terminal $V_{CC}$ due to temperature changes are negligible because each of the temperature coefficients of the devices in the circuit cancel each other out. For example, because zener diode 30 is a 4.7 zener diode it has a nominal temperature coefficient of 0. The base-emitter junctions of transistors 26 and 36 each have a −2 mv/°C. temperature coefficient; however, they act to cancel each other out. For example, when transistor 36 has a higher base voltage due to cold temperature, the base of transistor 26 will have a correspondingly higher base-emitter voltage drop which cancels the out the effect of the other.

Variations in the 5 volt supply due to variations in the voltage supplied by battery 14 are also negligible because the regulation current through zener diode 30 is well above its zener knee current, $I_{ZK}$. Therefore, zener diode 30 operates in the region where its zener resistance is minimized. In this portion of its operating range, variations in current through the device have little effect on voltage variations across the device. An advantage is thereby obtained of providing a regulated output voltage less susceptible to variations in temperature or in the level of voltage supplied by battery 14.

The operation of power supply circuit 10 in providing the power on reset (POR) function to microcomputer 12 will now be described. As noted above, transistor 36 cannot forward bias until capacitor 32 is sufficiently charged to 0.6 volts. With transistor 36 in its cut-off state (see curve C in FIG. 2), a current path is established through resistor 40 which forward biases the base-emitter junction of transistor 38. Sufficient current is then present through the base-emitter junction of transistor 38 to cause it to be in saturation. With transistor 38 in saturation, the collector of transistor 38 is pulled to a potential close to ground (see curve E in FIG. 2). Accordingly, a signal of a relatively low logic level is present on the reset terminal of microcomputer 12. The low level signal present at the reset pin inhibits the operation of microcomputer 12.

Once capacitor 32 is charged, the base-emitter junction of transistor 36 forward biases so that transistor 36 turns on (see curve C in FIG. 2). With transistor 36 in saturation, the collector of transistor 36 is pulled close to ground. Transistor 38 then turns off since its base-emitter junction is no longer forward biased (see curve E in FIG. 2). With transistor 38 off, a signal of a relatively high logic level is applied to the reset terminal to enable initialization of microcomputer 12 to a known operating state. Microcomputer 12 will then continue to operate according to its preprogrammed strategy so long as ignition switch 16 remains closed and battery voltage $V_{BATT}$ is greater than 6.5 volts such that power supply circuit 10 continues to provide the regulated 5 volts to power input terminal $V_{CC}$ and the relatively high logic level signal to the reset terminal of microcomputer 12.

Once ignition switch 16 is opened or the voltage supplied by battery 14 drops below 6.5 volts, capacitor 24 discharges to provide power to power supply circuitry 10. When the drop in battery voltage is only a momentary interruption, the discharging of capacitor 24 may prevent power supply circuit 10 from dropping out of regulation. However, once the voltage at node A drops below 5.6 volts, zener diode 30 no longer conducts the regulation current (at time $t_{Z\,OFF}$). In this state, capacitor 32 discharges through resistor 34 and the base of transistor 36 is pulled essentially to ground potential. Accordingly, transistor 36 turns off (see curve C in FIG. 2). With transistor 36 off, its collector-emitter junction becomes an open circuit and current flow is diverted through the base-emitter junction of transistor 38 thereby forcing transistor 38 into saturation (see curve E in FIG. 2). With transistor 38 in saturation, the collector of transistor 38 is pulled close to ground and a low level logic signal is applied to the reset terminal of microcomputer 12. Therefore, just as power supply circuit 10 falls out of regulation (approximately 4.8 volts at node D), a low level logic signal is applied at the reset terminal to inhibit the operation of microcomputer 12. An advantage is thereby obtained of insuring that microcomputer 12 is reset prior to the supply voltage $V_{CC}$ reaching 4.5 volts so that microcomputer 12 cannot operate in an unknown state. A further advantage of the above embodiment of the invention is that a single voltage regulating element is used by power supply circuit 10 to both provide a regulated output voltage to the power input terminal $V_{CC}$ of microcomputer 12 and to generate the reset/inhibit signal at the reset terminal.

This concludes a description of an embodiment of the invention. The reading of it by those skilled in the art will bring to mind many alterations and modifications beyond those already suggested above without departing from the spirit and scope of the invention. For example, while the reset circuitry in the present embodiment includes an inverting transistor, one skilled in the art will recognize that alternative circuitry including other digital or analog devices could be used to provide the two state signal in response to sensing the conductivity of zener diode 30. Accordingly, it is intended that the scope of the invention be limited to only the following claims.

What is claimed:

1. A circuit for coupling power from a DC source to a microcomputer and for resetting the microcomputer when the voltage level of the DC source rises above a threshold level, comprising:

a regulator circuit including a zener diode having a conductive state when the voltage level of the DC source is above a threshold value and a non conductive state when the voltage level of the DC source is below said threshold value that is dependent upon the zener voltage of said zener diode;

said regulator circuit coupled to the DC source for providing a regulated supply voltage to the microcomputer;

said regulator circuit also providing a regulation signal having a first state when said zener diode is operating in said conductive state and a second state when said zener diode is operating in said nonconductive state; and means responsive to said regulation signal for providing a reset signal to the microcomputer, said reset signal having a first state when said zener diode is operating in said conductive state and a second state when said zener diode is operating in said non conductive state, wherein said zener diode controls the level of said regulated supply voltage.

2. A circuit as in claim 1 further comprising delay means coupled to said regulator circuit for delaying provision of said reset signal to the microcomputer for a predetermined period of time.

3. A circuit for providing regulated power to a microcomputer from a DC source, inhibiting operation of the microcomputer when the voltage supplied by the DC source drops below a predetermined threshold value above a ground potential, and resetting the microcomputer when the voltage supplied by the DC source raises above the predetermined threshold value, comprising:

a transistor having a collector, a base and an emitter, said collector coupled to the DC source, and said emitter coupled to a supply voltage terminal of the microcomputer;

a zener diode coupled to said base of said transistor; and ground said zener diode having a conductive state and a non conductive state;

reset circuitry responsive to said zener diode for applying a reset signal to a reset terminal of the microcomputer when the zener diode is in said conductive state and to inhibit said reset signal to said reset terminal when said zener diode is in said non conductive state.

4. A circuit as in claim 3 further comprising a time delay triggered when said zener diode enters said conductive state, said time delay delaying application of said reset signal by said reset circuitry at the reset terminal of the microcomputer for a predetermined period of time.

5. A circuit for providing regulated power to a microcomputer from a DC source, inhibiting operation of the microcomputer when voltage supplied by the DC source drops below a predetermined threshold value above a ground potential, and resetting the microcomputer at a reset terminal when the voltage supplied by the DC source is below the predetermined threshold value comprising:

a first transistor having a collector, a base and an emitter, said collector coupled to the DC source, and said emitter coupled to a supply voltage terminal of the microcomputer;

a voltage divider comprising a first resistor, a zener diode having an anode and a cathode, and a second resistor, wherein said first resistor is connected between the collector and base of said first transistor, said cathode of said zener diode is connected to said base and said first resistor, and said second resistor is connected between said anode of said zener diode and ground potential;

said zener diode having a conductive state when the voltage at its cathode is above a predetermined threshold and a non-conducing state when the voltage at its cathode is below said predetermined threshold;

said zener diode of said voltage divider causing said first transistor to regulate the voltage applied to said supply voltage terminal when said zener diode is in its conducting state and to inhibit the application of regulated voltage to said supply voltage terminal when said zener diode is in its non-conducting state;

reset circuitry coupled to said zener diode and being responsive to said zener diode being in its conducting and nonconducting states for applying a reset signal to said reset terminal when said zener diode is in its non-conducting state.

* * * * *